Jan. 28, 1936. M. ITO 2,028,780
ELECTRIC ARC WELDER
Filed July 8, 1933
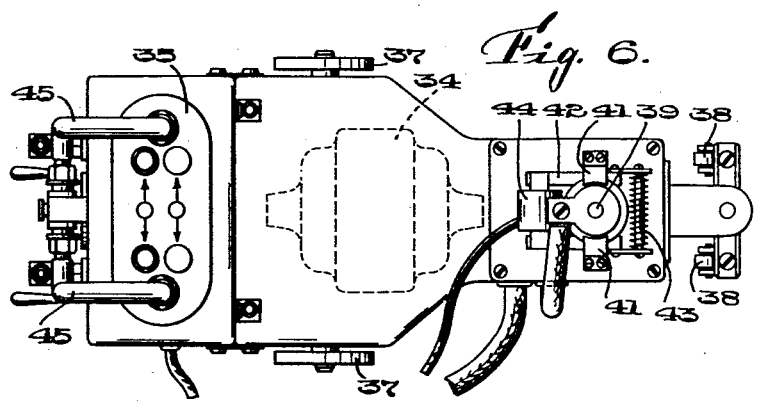
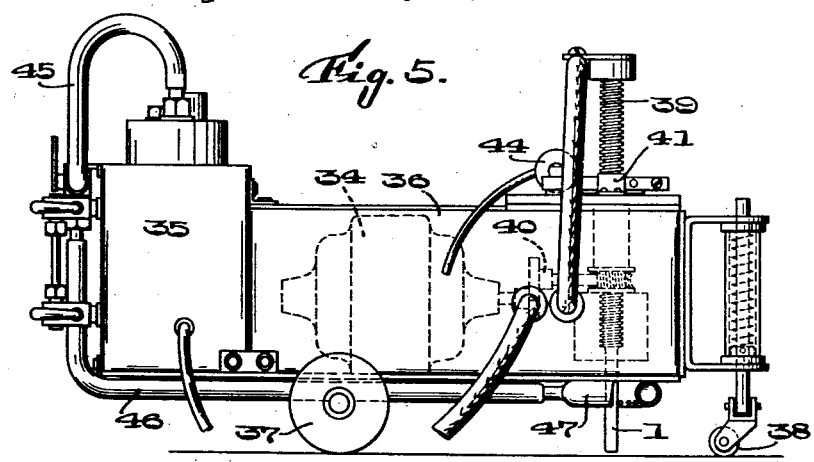
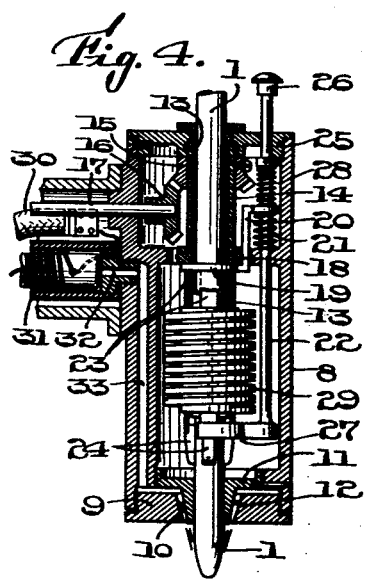
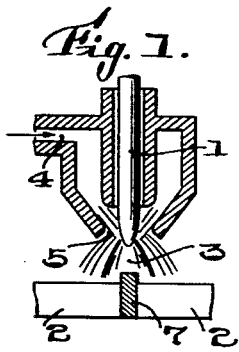
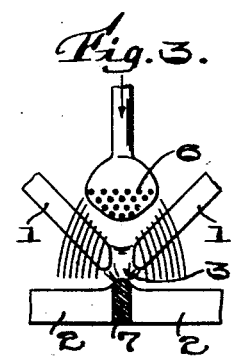
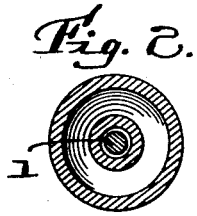
INVENTOR:
MASAJI ITO
BY Francis E. Boyce
ATTORNEY Patented Jan. 28, 1936

2,028,780

UNITED STATES PATENT OFFICE 2,028,780

ELECTRIC ARC WELDER

Masaji Ito, Sumaura-dori, Suma-ku, Kobe, Japan, assignor to Kabushiki Kaisha Kawasaki Zosensho (Kawasaki Dockyard Co. Ltd.), Kobe, Japan, a corporation of Japan Application July 8, 1933, Serial No. 679,590
In Japan October 22, 1932

4 Claims. (Cl. 219—8)

The present invention relates to a method and apparatus for electric-arc welding, which method consists in blowing jets of steam along a carbon electrode, producing water gas by the reaction of said steam with carbon at a high temperature and protecting the part to be welded electrically with an atmosphere of said water gas. The object thereof is to obtain a method and apparatus for electric-arc welding which produce water gas automatically by simply blowing steam against a carbon electrode without using a complicated water gas producer and to conduct electric-arc welding in an atmosphere of said water gas to prevent the metal to be welded from becoming deteriorated or brittle on account of oxygen or nitrogen in air acting upon it and thus to promote its malleability and ductility.

Referring to the accompanying drawing,

Fig. 1 is a section showing diagrammatically the essential feature of the construction of the electric-arc welder for performing the electric-arc welding of this invention;

Fig. 2, a horizontal section of the same and

Fig. 3, a skeleton of the electric-arc welding of the present invention.

Fig. 4 is a sectional view of a manually operated electric-welder constructed in accordance with this invention.

Fig. 5 is an elevation of a semi-automatic electric-arc welding apparatus constructed in accordance with this invention.

Fig. 6 is a plan view of the semi-automatic apparatus.

In the drawing, 1 is a carbon electrode. In the form, as shown in Fig. 1, an electric-arc 3 is produced between a carbon electrode 1 and a filler metal 7 held between base metals 2 to be welded; and in a second form the arc may be produced between carbon electrodes 1 and 1 as shown in Fig. 3. These electrodes are fed automatically by electro-magnetic or manual means as they are consumed, in order to keep the length of the arc constant. In the construction shown in Fig. 1, the steam fed from an inlet 4 is blown around the end of the electrode through an outlet 5; and in the construction shown in Fig. 3 the steam is sprayed against the ends of the electrodes 1, 1, from a jet 6 provided with numerous small holes, so that the steam comes into contact with the electrodes while the latter are heated at a high temperature by the arc 3 poduced between the electrode and the metal to be welded or between the electrodes. In brief, this causes the following chemical reaction and produces water gas:—

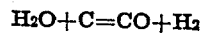

$$H_2O + C = CO + H_2$$

This water gas is a mixed gas consisting of the indicated proportions of carbon monoxide and hydrogen and has the condition of an atmosphere surrounding the electric-arc 3.

Now, water gas having strong reducing property, it is needless to say that when a metal is welded in its atmosphere, oxygen or nitrogen in the air does not combine with the metal and therefore the metal is protected from brittleness and deterioration thus making it possible to secure a good welding condition which promotes the malleability and ductility of the metal, because the carbon monoxide contained in water gas not only combines with oxygen from the outside, becoming converted to carbon dioxide, but has the property of reducing oxidized metals and also the hydrogen contained therein possesses substantially the similar property. Moreover, a part of the hydrogen meets the arc and is ionized into an atomic state by its high temperature and produces a large amount of heat when it recombines, thus concentrating the heat locally to enable a perfect welding operation to be performed.

The reason why water gas with all such advantage has not yet been generally adapted, is due to the complication of the method of production. For example, according to Kerpely's system mixed gas is formed by charging coal from the upper part of the furnace and blowing in air and steam from its lower part. That is to say, the air blown in combines with red-heated carbon and turns into $CO_2$.

$$C + O_2 \rightleftharpoons CO_2 + 75600 \text{ calories} \quad (1)$$

By the quantity of heat thus generated the temperature in the furnace is elevated, and when steam is passed through it, carbon monoxide and hydrogen will be obtained according to the following equation:—

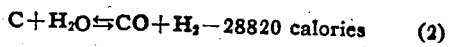

$$C + H_2O \rightleftharpoons CO + H_2 - 28820 \text{ calories} \quad (2)$$

However, as this chemical change has great heat-absorbing action as shown above, the temperature in the furnace is lowered rapidly. This chemical change occurs only above 1150° C. and if this temperature is lowered to below 850° C., instead of such chemical change the following one takes place:—

$$C + 2H_2O \rightleftarrows CO_2 + 2H - 18680 \text{ calories} \qquad (3)$$

That is to say, the desired carbon monoxide cannot be obtained, but the whole is converted into carbon dioxide, so the introduction of steam is stopped and further supply of air is given to burn the carbon in the furnace and raise the temperature in the furnace up to above 1150° C. Then, steam is introduced into it. This is what is called "repeated process". According to the above process, the mixed gas contains carbon dioxide produced to elevate the temperature of carbon in the furnace and nitrogen gas because of the introduction of air, and owing to the "repeated process" which causes the above changes alternately the produced gas substantially contains 26–32% of CO, 1–3% of $CH_4$, 6–12% of $H_2$, 2–4% of $CO_2$ and 55–60% of $N_2$. Even the most excellent gas thus produced usually contains only 30% of CO. But in electric-welding, as the temperature reaches as much as 3000–3500° C., nitrogen, which is very inactive chemically at the ordinary temperature, is dissociated at 3,500° C. into what is called an excited form. Thus, it is given the chemical affinity almost equal to oxygen, which is indeed the reason why the welded steel and its alloy in electric welding are hardened very much to become brittle and deteriorated. Therefore, to remove nitrogen from the gas such as mentioned above which is produced in the generator it is necessary to introduce oxygen gas instead of air, but it is impracticable owing to big cost as well as other reasons.

In the present invention, as carbon is supplied in the gas producing action and also since it serves as electrodes, oxygen is not necessary to elevate the temperature of that part of the carbon which causes chemical change. That is to say, without the necessity of supplying air, electrons are produced electrically at the cathode and pass to the anode, thus supplying entirely electrical energy to maintain carbon at a high temperature. Therefore, it is quite different in the idea from increasing the temperature of carbon by carrying out chemical action at a little distance from the electric arc and causing the chemical change as indicated in the Equation (1). Further, as on the other hand electrical energy is introduced continually, the temperature may be kept constant, even if heat absorbing action is produced by the chemical change shown in the Equation (2) producing monoxide, because the temperature of that part is not lowered by the heat generating action due to the electrical power for it. Thus, it is possible to continuously produce gas containing only pure hydrogen and carbon monoxide free from dioxide and nitrogen, which has hitherto been considered impracticable chemically. Moreover, it is possible to produce easily mixed gas quite free from nitrogen most harmful to welding. Next, let me explain the reason how, when electric arc welding is effected with this gas, the welded part is not hardened and consequently does not become brittle and accordingly it is possible to obtain a welded metal of superior quality having high ductility and strength without any blow holes in the interior and how in the welding operation this electric arc is stable and the operation is easy as compared with the case in air.

Generally, to stabilize the electric arc produced between both electrodes the welded part must be heated locally to a high temperature, in accordance with Joule's law, generated in passing electric current to both electrodes brought into contact with each other, so that an electron is allowed to escape and strike against the anode to elevate the temperature of that part. Therefore, when there is any cause to cool this part and lower its temperature, it is needless to say that the electric arc becomes unstable.

In the mixed gas of carbon monoxide and hydrogen, the decomposition of carbon monoxide occurs in the neighborhood of air owing to its exceedingly great heat, when heat quantity of as much as 258,000 calories per molecule is absorbed. Therefore, although its temperature is lowered quickly, the liberated carbon is converted into smoky solid carbon immediately when it is separated even at the least from the highest temperature electric arc, and this reaction generates heat again very much as follows:—

$$C(\text{gaseous}) = C(\text{solid state}) + 141{,}000 \text{ cal.}$$

Consequently, the temperature in the neighborhood of the electric arc is not lowered, but on the contrary hydrogen is dissociated therein into an atomic state at 1900° C. That is to say, as high heat is generated by the combination of this atomic hydrogen and the oxygen separated from carbon monoxide at a little distance from the electric arc, the electric arc portion is not cooled, so that the high temperature is maintained to make the electric arc stable. Although firstly gas is blown in the state of water and turned into mixed gas by the kinetic energy given mechanically, the harmful air and the nitrogen contained therein are completely removed by the blowing power and then the above-mentioned welding is performed in CO and $H_2$ gas, so no oxidation or nitrogenization occurs in either the interior or surface of a metal, and as a metal, after rapidly melted, is hardened slowly in high temperature hydrogen, the air bubbles produced in its interior are allowed to escape easily, thus preventing it from becoming porous and also keeping it from a harmful substance which deteriorates it. Consequently, it is possible to obtain a metal of high ductility and effect the welding of metals extensively.

Furthermore, there is no danger to be caused by the explosion due to the defect in an apparatus for storing or transporting water gas. Further, it enables iron, copper, aluminium brass, aluminium alloy, etc., which are most difficult to be welded by an electric-arc, to be welded easily and perfectly without using any flux and free from blow holes.

Referring to Fig. 4 which shows the construction of a manually-operated electric-arc welding apparatus in accordance with this invention, a casing 8 is provided at its lower end with a base member securely fixed to the casing and pierced with an opening 10 which forms an inverted frustum of a cone into which the projected portion of a sleeve 11 secured to the casing 8 extends to leave a space 12 to furnish a steam jet. A carbon electrode 1 is inserted in an inner tube 13 fitted in a sleeve 14 on which is securely mounted a bevel gear meshing with a bevel gear 16 connected to a rod 17 driven by suitable means (not shown), the lower end of the electrode projecting out of the sleeve 11. Against the under surface of a bearing 18 supporting the sleeve 14 there is pressed a ring 19 formed integrally with an arm 20. The ring being pressed by means of a spring 21 wound upon a rod 22. Suitable pairs of members 23 are secured to the ring 19 and extend downward along the electrode 1, each member being provided at its end with a shoe 24 for use in grasping the respective electrode 1. The controlling rod 22 is provided at its upper end, which projects from a cover 25, with a cap 26 and at its lower end with a gripper 27, and said rod is normally held up by means of a spring 28 wound thereon. Therefore, the shoe 24 engages with the electrode 1 and prevents the rotation of the latter from its friction on the inner surface of the tube 13, unless the rod 22 is pressed down to release the engagement of the gripper 27 and shoe 24. A coil 29 surrounding spirally the electrode 1, is connected with a suitable source of current through a lead wire 30 so as to produce magnetic flux for controlling an electric-arc during the flow of the arc current. Water vapour is heated sufficiently in an electrical heating element 31 and supplied to the top of the electrode 1 through an inlet 32, a passage 33 and the steam jet 12.

Figs. 5 and 6 show a semi-automatic electric-arc welding apparatus of track type according to the present invention. An electric motor 34 and a steam producer 35 are mounted upon a car 36 which is transported freely by means of large and small wheels 37 and 38. A screw 39 holding an electrode 1 is adapted to be rotated slowly through a suitable gear train 40 from the motor 34. A pair of shoes 41 adapted to be operated by magnet are normally held released from the screw stud 39 by the tension of a spring 43. But, when a magnetic coil 44 is energized to press a pair of shoes 41 against the rotating screw stud, said rotating stud moves longitudinally and feeds the electrode 1 to the base metal. The water vapour generated in the steam producer 35 is led through pipes 45 and 46 and is blown around the end of the electrode 1 at high temperature from a jet 47 in order to produce a water gas and protect the part to be welded electrically with an atmosphere of said water gas.

I claim:

1. In a welding device, a casing, an electrode holder rotatably supported in said casing, means to rotate said holder, an electrode frictionally gripped by said holder, a gripper arranged to hold said electrode against movement in the holder, manually operable means for releasing said gripper, a second casing surrounding the first casing and having an open end arranged to form a hollow frusto-conical jet surrounding the active end of the electrode, and means to introduce steam under pressure between said casings.

2. A welding device including a casing, a closure for the bottom end of said casing and having an inverted frusto-conical opening, a second closure spaced above the first closure and having an inverted frusto-conical boss projecting into the opening in the first closure in spaced relation to the wall of said opening, said second closure having an electrode receiving opening, means to supply hot steam to the space between said closures, an electrode extending through the opening in the second closure, a series of spring gripper fingers surrounding said electrode within the casing, means normally urging said fingers into gripping engagement with the electrode, and means to release the fingers and permit movement of the electrode.

3. A welding device including a casing, a closure for the bottom end of said casing and having an inverted frusto-conical opening, a second closure spaced above the first closure and having an inverted frusto-conical boss projecting into the opening in the first closure in spaced relation to the wall of said opening, said second closure having an electrode receiving opening, means to supply hot steam to the space between said closures, an electrode extending through the opening in the second closure, a series of spring gripper fingers surrounding said electrode within the casing, means normally urging said fingers into gripping engagement with the electrode, means to release the fingers and permit movement of the electrode, and means to rotate the electrode when released.

4. A welding device including a casing, a closure for the bottom end of said casing and having an inverted frusto-conical opening, a second closure spaced above the first closure and having an inverted frusto-conical boss projecting into the opening in the first closure in spaced relation to the wall of said opening, said second closure having an electrode receiving opening, means to supply hot steam to the space between said closures, an electrode extending through the opening in the second closure, a series of spring gripper fingers surrounding said electrode within the casing, a sleeve in the upper end of the casing, a tube frictionally fitted on the electrode and frictionally fitted within the casing, means to rotate said sleeve, a ring surrounding the lower end of said tube and supporting said gripper fingers, a clamp engaging said fingers to hold them in gripping engagement with the electrode, spring means normally urging said clamp to engage said fingers, and means to move the clamp against the action of the spring and thereby to release said fingers from the electrode.

MASAJI ITO.